United States Patent [19]

Borowski et al.

[11] 4,200,364
[45] Apr. 29, 1980

[54] MOTION PICTURE CAMERA

[75] Inventors: Kurt Borowski, Aschheim; István Cocron; Theodor Huber, both of München, all of Fed. Rep. of Germany

[73] Assignee: AGFA-Gevaert, A.G., Leverkusen, Fed. Rep. of Germany

[21] Appl. No.: 928,060

[22] Filed: Jul. 26, 1978

[30] Foreign Application Priority Data

Jul. 29, 1977 [DE] Fed. Rep. of Germany ....... 2734309

[51] Int. Cl.² .............................................. G03B 7/08
[52] U.S. Cl. .................................. 352/141; 352/91 C; 352/91 S
[58] Field of Search ...................... 352/91 C, 91 S, 141

[56] References Cited
U.S. PATENT DOCUMENTS

| 4,006,975 | 2/1977 | Wagensonner et al. | 352/91 C |
| 4,084,893 | 4/1978 | Flandorfer | 352/141 |
| 4,106,864 | 8/1978 | Burgermann | 352/91 S |
| 4,106,865 | 8/1978 | Burgermann | 352/91 C |

Primary Examiner—Russell E. Adams
Attorney, Agent, or Firm—Peter K. Kontler

[57] ABSTRACT

A motion picture camera wherein the diaphragm is adjusted in automatic response to signals from two outputs of a digital comparator which receives a first set of signals during each revolution of the shutter at a frequency varying as a function of changes of shutter speed and of changes of scene brightness. The comparator further receives a set of reference signals from a digital selector circuit during normal operation of the camera or from a binary counter when the camera is set for making exposures with fade-in, fade-out or lap dissolve. The counter forms part of a program circuit.

14 Claims, 3 Drawing Figures

MOTION PICTURE CAMERA

BACKGROUND OF THE INVENTION

The invention relates to motion picture cameras, and more particularly to improvements in exposure controls for motion picture cameras. Still more particularly, the invention relates to improvements in automatic exposure controls for motion picture cameras of the type wherein the shutter is driven by an electric motor of the film transporting unit and the aperture size is regulated as a function of scene brightness.

The invention further relates to improvements in motion picture cameras which are designed to make exposures with fade-in, fade-out and fadeover (lap dissolve) effects. The camera constitutes an improvement of the camera which is disclosed in the commonly owned U.S. Pat. No. 4,043,649 granted Aug. 23, 1977 to Helmut Mayr.

OBJECTS AND SUMMARY OF THE INVENTION

An object of the invention is to provide a motion picture camera wherein the effective size of the aperture can be regulated in a simple, energy-saving and reliable manner and which allows for digital adjustment of the aperture size.

Another object of the invention is to provide a motion picture camera wherein the shutter can be driven at several speeds and the aperture size can be adjusted automatically as a function of changes of the shutter speed.

A further object of the invention is to provide a novel and improved integrated circuit arrangement for a motion picture camera of the above outlined character.

An additional object of the invention is to provide the motion picture camera with novel and improved fader means for making exposures with special effects including fade-in, fade-out and lap dissolve.

Another object of the invention is to provide a motion picture camera which embodies the above outlined features, which is sufficiently sophisticated for use by advanced amateurs and/or professionals, and whose manipulation is sufficiently simple to warrant its use by unskilled amateurs without affecting the quality of exposures.

One feature of the invention resides in the provision of a motion picture camera which comprises an adjustable diaphragm, motor means (preferably motor means which constitutes a component of an electromagnetic drive) which is operative to adjust the effective size of the aperture defined by the diaphragm, a rotary shutter in front of the diaphragm, pulse generator means including a frequency-determining photosensitive receiver disposed behind the diaphragm so as to receive scene light which passes through the aperture (the pulse generator means is arranged to transmit signals whose duration is a small fraction of intervals during which the shutter permits or prevents impingement of scene light upon the diaphragm and hence upon a film frame behind the diaphragm), binary counter means connected with the pulse generator means to receive signals therefrom, means for activating the counter means in rhythm with movements of the shutter to light-transmitting and light-intercepting positions, a digital shift register arranged to receive and advance the signal combination which is transmitted by the counter means at the completion of each activation of the counter means, a first signal source which is operative to transmit a fixed digital reference signal combination, a digital comparator having first terminals which are connected with the outputs of the shift register to receive signal combinations furnished by the counter means and second terminals, and a second source which is operative to transmit a variable second digital reference signal combination (such second source may include a program circuit), and a switch or other suitable means for selectively connecting the second terminals with one of the two sources at a time. The camera is set for normal operation when the second terminals of the comparator are connected with the first source, and the camera is set to make exposures with special effects when the second terminals of the comparator are connected with the second source. The comparator has output means connected with the motor means for the diaphragm, and such output means preferably includes at least two outputs one of which transmits first control signals which cause the motor means to adjust the diaphragm (i.e., to increase or reduce the effective size of the aperture) when the signal combination which is applied to the first terminals of the comparator deviates from the combination which is applied to the second terminals. Another output of the comparator transmits second control signals which cause the motor means to interrupt the adjustment of the diaphragm when the signal combination which is applied to the first terminals matches the signal combination which is applied to the second terminals.

The activating means preferably comprises a signal generator including a photocell which transmits signals as a function of the angular position of the shutter. Such photocell may include a light emitting diode in front of the shutter and a photoelectric transistor behind the shutter in line with the diode.

The pulse generator means preferably comprises a photosensitive receiver which receives scene light via aperture of the diaphragm, an operational amplifier (preferably an impedance converting amplifier) having an input connected with the receiver and an output, and a voltage-frequency converter connecting the output of the amplifier with the counter.

The shift register has a start input which is connected with the activating means and the counter means comprises a reset input which is connected with a time-delay unit of the activating means.

Another feature of the invention resides in the provision of a fader which includes the aforementioned digital comparator, the aforementioned second source and the aforementioned switch. The second source comprises a bidirectional binary counter, means for advancing the counter by at least one step in response to each revolution of the shutter (i.e., in response to transport of successive film frames past the exposure station) and an evaluating circuit connected with the binary counter between the binary counter and the second terminals of the digital comparator. The evaluating circuit includes means for setting the binary counter in an up or forward mode to thereby adjust the diaphragm for exposures with fade-out via digital comparator and diaphragm adjusting means, means for terminating the up mode upon completion of exposures with fade-out, means for effecting rearward transport of film frames which were exposed with fade-out in response to termination of the up mode, and means for setting the binary counter in a reverse counting mode on completion of rearward transport of film frames which were exposed with fade-out so as to adjust the diaphragm for exposures with fade-in via digital comparator and diaphragm adjusting means.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
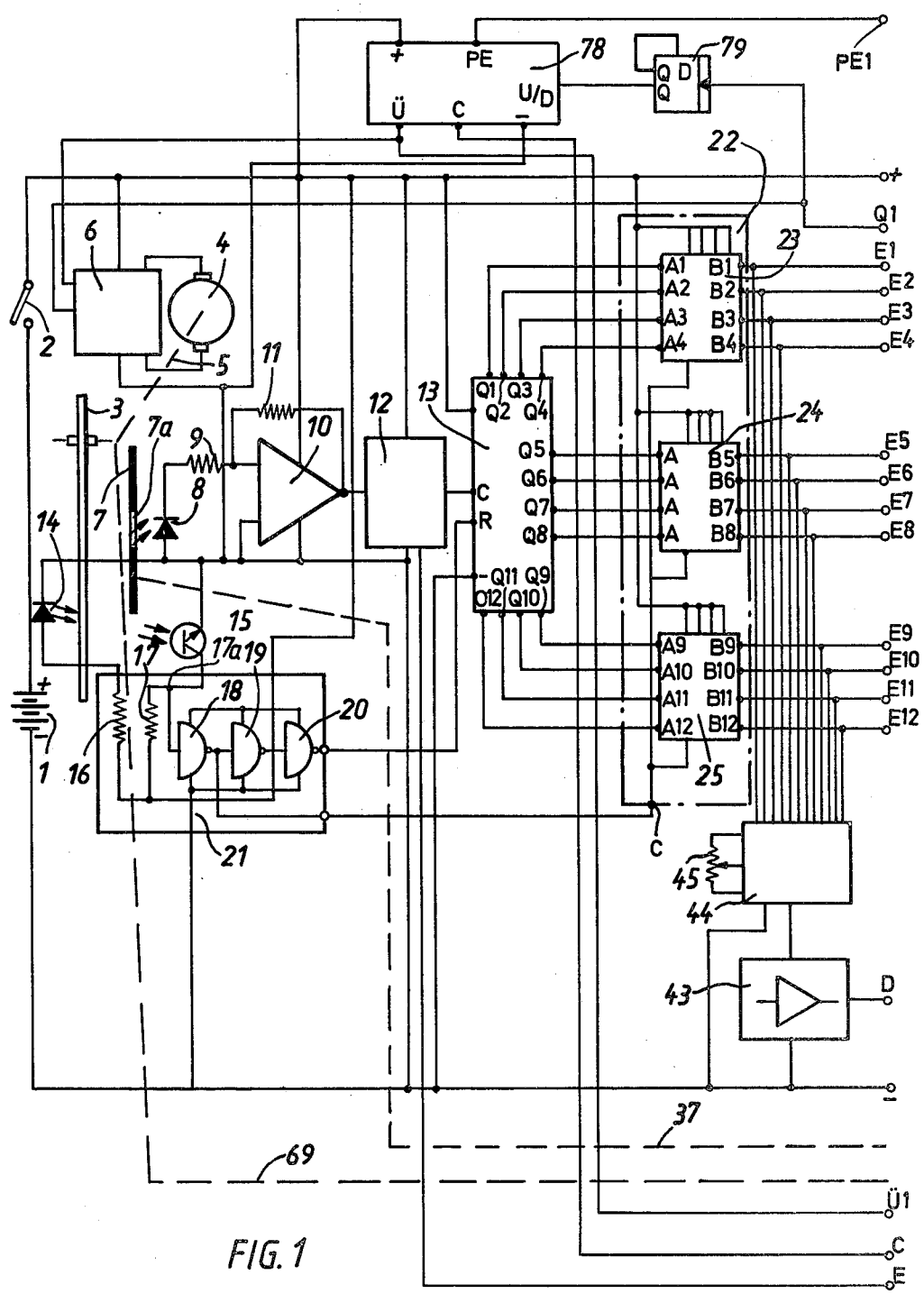
FIGS. 1 and 2 together show certain components of the improved motion picture camera including a digital control system for the diaphragm and shutter.

Referring first to FIG. 1, the motion picture camera comprises a battery 1 or another suitable source of electrical energy which can be connected in circuit with various components of the electrical system in response to closing of an on-off switch 2. A rotary shutter 3 is driven by a reversible electric motor 4 for film transport through the medium of a transmission 5 which is indicated by a broken line. The motor 4 is a DC motor and is in circuit with a control unit 6 which can start and arrest the motor and hence the shutter 3. The control unit 6 further comprises means for reversing the direction of rotation of the rotor of the motor 4.

The motion picture camera further comprises a diaphragm 7 which is located in front of a frequency-determining silicon receiver 8. The latter is connected with one input of an operational amplifier 10 via resistor 9. The amplifier 10 may constitute a combined impedance converter and amplifier. A feedback resistor 11 connects the one input with the output of the amplifier 10. The voltage at the output of the amplifier 10 is proportional to the intensity of light which impinges upon the receiver 8, and this output is connected with a voltage-frequency converter 12. The reference character 13 denotes a binary counter whose start input C is connected with the output of the converter 12. The parts 8 to 12 together constitute a pulse or signal generator.

A light-emitting diode 14 is installed in front of the rotary shutter 3 to cooperate with a photoelectric transistor 15 which is installed in the housing or body of the camera behind the shutter in line with the diode 14. The parts 14 and 15 constitute a photocell and the diode 14 is connected in series with a resistor 16. The transducer 15 is connected to and constitutes with a resistor 17 a voltage divider whose tap 17a is connected with a combined delaying and inverting circuit 21 which comprises three inverter stages 18, 19 and 20. The output of the stage 20 is connected with a reset input R of the binary counter 13. The counter 13 is placed in a condition of readiness when the activating signal generator means including the photocell 14, 15 begins to transmit a signal. When the transmission of signal from the transducer 15 is terminated, the binary counter 13 is arrested and reset to zero. The transducer 15 ceases to transmit a signal when the light-transmitting stage of a revolution of the shutter 3 is completed, i.e., when the shutter interrupts the admission of scene light to a film frame via aperture 7a of the diaphragm 7. The duration of signals which the converter 12 transmits to the binary counter 13 is a small fraction of the interval during which the shutter 3 permits or prevents scene light to reach the aperture 7a.

Since the frequency of signals which the converter 12 transmits is a function of scene brightness, and since the total number of such signals depends on the speed of the shutter, 3, i.e., on the length of the interval during which the circuit 21 is operative to activate the counter 13, the improved camera automatically compensates for incidental or intentional fluctuations of the RPM of the shutter 3.

Outputs Q1 to Q12 of the binary counter 13 are connected with corresponding inputs A1 to A12 of a parallel shift register 22 which consists of three four-bit stages 23, 24 and 25. An input C of the shift register 22 receives signal transporting pulses and is connected with the output of the inverter stage 18 of the circuit 21. The downwardly sloping flank of each signal which is furnished by the photocell 14, 15 effects the transport of signals from the inputs A1 to A12 to outputs B1 to B12 of the shift register 22.

Figure 2:
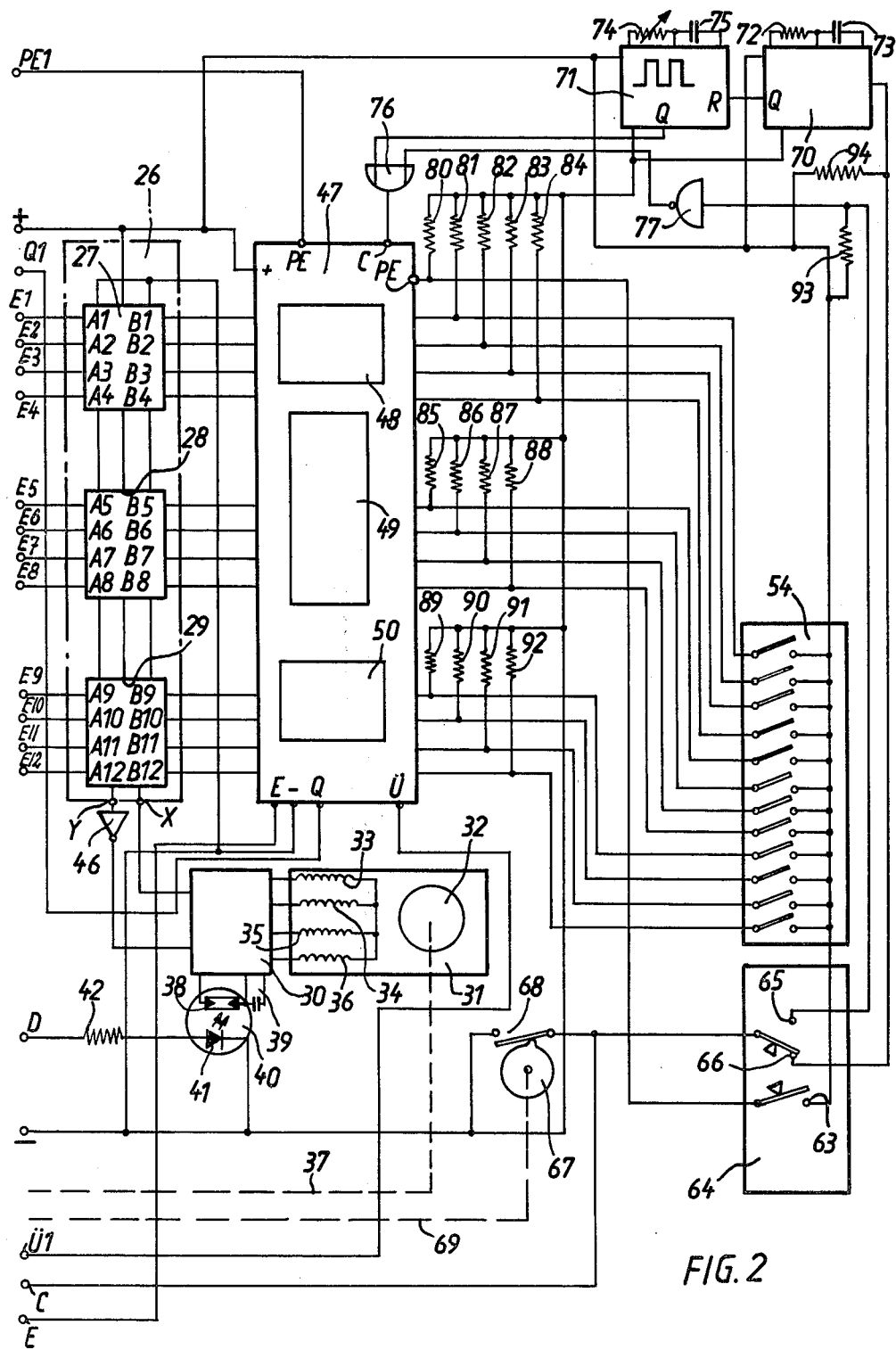

As shown in FIGS. 1 and 2, the outputs B1 to B12 of the shift register 22 are connected with input terminals A1 to A12 of a comparator 26 via contacts E1 to E12. The comparator 26 comprises three four-bit comparator stages 27, 28 and 29. Furthermore, the comparator 26 comprises two evaluating outputs X and Y. The control signal at the output X indicates that the signal combination which is applied to the terminals A1-A12 of the comparator 26 does not match the signal combination at terminals B1-B12 of the comparator 26, and the control signal at the output Y is a stop signal which indicates that the signal combination at the terminals A1-A12 of 26 matches the signal combination at the terminals B1-B12 of 26. The outputs X and Y are connected with a control circuit 30 for an electromagnetic drive including a stepping motor 31. The latter comprises an armature 32 and four windings 33, 34, 35 and 36. The output element of the stepping motor 31 is mechanically connected with the diaphragm 7; the mechanical connection is indicated by the broken line 37. The control signal which is transmitted by the output X causes the motor 31 to adjust the diaphragm 7, and the control signal at the output Y stops the motor 31. The (positive or negative) sign of the control signal at the output X determines the direction of adjustment of the diaphragm 7, i.e., to increase or reduce the effective size of the aperture 7a. The output X can be replaced with two outputs one of which transmits control signals to reduce and the other of which transmits control signals to increase the effective size of the aperture 7a.

The frequency of stepwise advances of the stepping motor 31 is determined by an RC circuit including a photoresistor 38 and a capacitor 39. The photoresistor 38 constitutes a component of an optical coupling 40 which further includes a light-emitting diode 41. The diode 41 is connected with an output D of an analog amplifier 43 via resistor 42. The amplifier 43 (shown in FIG. 1) is installed in the output circuit of a digital-analog converter 44 which is provided with an adjustable resistor 45. The inputs of the converter 44 are connected with the outputs B1 to B12 of the parallel shift register 22. A further inverter 46 is connected with the output Y of the comparator 26.

The terminals B1 to B12 of the comparator 26 are connected with corresponding inputs of a program circuit 47 which comprises a binary evaluating counter 48, a shift register 49 and an auxiliary comparator 50.

Figure 3:
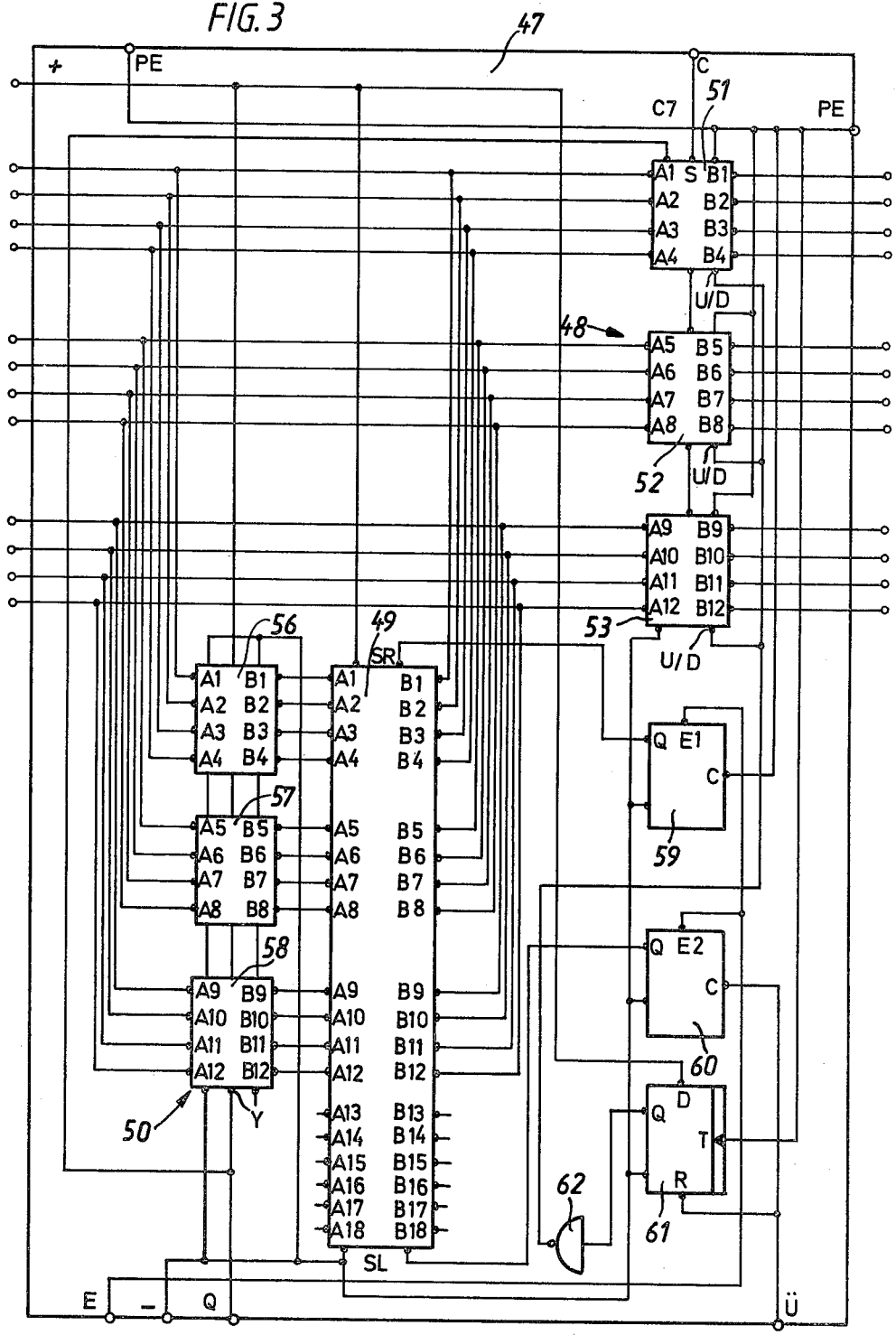
FIG. 3 is a diagram of a portion of the circuit which controls the making of exposures with fade-in, fade-out and lap dissolve.

The details of the program circuit 47 are shown in FIG. 3. The binary counter 48 comprises three four-bit stages 51, 52 and 53. Inputs A1 to A12 of the counter 48 are connected with the corresponding terminals B1 to B12 of the comparator 26. Outputs B1 to B12 of the counter 48 are connected with a digital selector circuit 54 which is shown in FIG. 2 and constitutes a source of a combination of fixed reference signals.

The conductors which are connected with the inputs A1 to A12 of the binary counter 48 are connected with corresponding terminals B1 to B12 of the shift register 49. Furthermore, the terminals A1 to A12 of the shift register 49 are connected with terminals B1 to B12 of the auxiliary comparator 50. Terminals A1 to A12 of the auxiliary comparator 50 are connected with the corresponding terminals A1 to A12 of the binary counter 48. The auxiliary comparator 50 comprises three four-bit stages 56, 57 and 58.

The shift register 49 has a storage capacity of eighteen bits. Thus, six terminals A13 to A18 and six terminals B13 to B18 (i.e., six stages) are unconnected. When the forward or up mode input SR of the shift register 49 receives six pulses from the output Q of an impulse generator here shown as a counter 59, the signal combination which is stored in the stages including the terminals A1 to A12 and B1 to B12 of the shift register 49 is advanced by six steps to the stages including the terminals A7 to A18 and B7 to B18.

An input C of the counter 59 receives start signals via preset-enable contact PE which is shown in the upper right-hand portion of FIG. 3. The signals to be counted are transmitted to an input E1 of the counter 59 from the converter 12 of the pulse or signal generator 8-12 via contact E which is shown in the lower left-hand portion of FIG. 3. A further impulse generator in the form of a counter 60 has an output Q which is connected to a reverse counting mode signal input SL of the shift register 49. The signals which are to be counted in 60 are transmitted to an input E2 from the contact E, i.e., from the converter 12 of the pulse or signal generator 8-12. A further input C of the counter 60 receives start signals from a contact Ü which is shown in the lower right-hand portion of FIG. 3. The counter 60 is designed in such a way that it transmits six signals in response to reception of a start signal, the same as the counter 59. Consequently, the signal combination is applied to the terminals A1 to A12 and terminals B1 to B12 of the shift register 49 after each sixth signal from 60.

The reference character 61 denotes a flip-flop whose pulsing input T is connected with the contact PE, whose terminal D is connected with the positive pole of the energy source 1, whose reset input R is connected with the contact Ü, and whose output Q is connected with an inverter 62 whose output is connected with forward/rearward inputs U/D of the stages 51-53 of the binary counter 48. The start signal input S of the binary counter 48 is connected with the terminal C of the program circuit 47. A stop signal input CJ of the binary counter 48 is connected with an output Y of the auxiliary comparator 50. The output Y of 50 transmits a signal when the signal combination at the terminals A1 to A12 of 50 matches the signal combination at the terminals B1 to B12 of 50. The output Y of 50 is further connected with the contact Q of the program circuit 47.

The contact PE of the circuit 47 is connected (see FIG. 2) with a switch 63 of a special-effect-selecting circuit 64 for fade-in, fade-out and lap dissolve operations. A two-position switch including stationary contacts 65, 66 is connected with a pulse generator which comprises a disk-shaped cam 67 and a switch 68 which can be actuated by the lobe of the cam 67. The cam 67 is mechanically connected with the shutter 3; the operative connection is shown at 69. The switch 68 causes the transmission of signals in response to advancement of successive film frames past the exposure station.

The signals which are generated on actuation of the switch 68 are transmitted to a monostable multivibrator 70 when the switch 66 is closed. An output Q of the multivibrator 70 is connected with start input R of an oscillator 71. The duration of the cycle of the monostable multivibrator 70 is determined by a time-delay unit including a resistor 72 and a capacitor 73. The pulse frequency of the pulse generator 71 is determined by a time-delay unit including a variable resistor 74 and a capacitor 75. The resistor 74 may constitute a photoresistor; it is then installed behind the diaphragm 7.

An output Q of the pulse generator 71 is connected with one input of an OR gate 76 whose output is connected with the contact C of the program circuit 47. The other input of the OR gate 76 is connected with the output of an inverter 77 whose input is connected with the switch contact 65. When the movable contact of the switch 65, 66 engages the fixed contact 65, the OR gate 76 receives a signal during each revolution of the shutter 3 and transmits the signal to the input S of the stage 51 of the binary counter 48.

The switch 68 is further connected to a contact C (shown in the lower left-hand portion of FIG. 2) and thence to the input C of a forward-rearward digital frame counter 78 shown in FIG. 1. The contact Ü of the circuit 47 is connected with an output Ü of the forward-rearward counter 78 via contact Ü1. The output Ü of the counter 78 transmits a signal when the counter 78 completes the forward or up mode and thereupon the reverse counting mode, i.e., when the counter 78 reassumes its original condition.

The contact Q of the program circuit 47 is connected with a contact Q1 (see FIG. 1, top right) for the input of a flip-flop 79 whose output Q is connected with the forward/rearward input U/D of the frame counter 78. The contact PE of the circuit 47 is connected with a contact PE1 for the input PE of the counter 78; the input PE prepares the counter 78 for the storage of signals denoting the number of film frames.

The output Ü of the frame counter 78 is connected with the control unit 6 for the motor 4. The output Q of the circuit 47 is further connected with the direction-reversing input of the control unit 6 for the motor 4.

The components 49, 50, 59, 60, 61, 70, 71 can be said to constitute a digital evaluating circuit which automatically arrests the binary counter 48 upon completion of fade-out, i.e., when the aperture size is reduced by a predetermined number of light levels. This evaluating circuit further prepares the counter 48 for the rearward counting mode. The start signal for such mode is supplied, upon completion of rearward transport of film frames which were exposed with fade-out, so that the camera makes exposures with fade-in, i.e., the frames which were exposed with fade-out are exposed again but with fade-in effect.

The operation of the motion picture camera is as follows:

The binary counter 13 receives signals whose number is a function of scene brightness and of the RPM of the shutter 3. The counter 13 is stopped and reset to zero when the shutter 3 interrupts the passage of scene light. Prior to resetting, the binary counter 13 transmits the accumulated signal combination to the shift register 22. The pulses at the input C transport the stored signal combination to the outputs of the shift register 22. The combination is compared with the combination of reference signals which is stored in the digital selector circuit 54.

The binary counter 48 is idle because the switch 63 of the special-effect selecting circuit 64 is open so that the signal at the input PE of the program circuit 47 is zero. Therefore, the signal combination which is furnished by the digital selector circuit 54 is applied, unchanged, to the terminals B1-B12 of the comparator 26. The outputs X and Y of the comparator 26 transmit control signals for operation of the stepping motor 31. When the signal combinations which the comparator 26 receives match, the control circuit 30 for the motor 31 receives a stop signal via output Y.

The speed at which the stepping motor 31 adjusts the diaphragm 7 depends from the circuit 38, 39. The frequency at which the motor 31 adjusts the diaphragm 7 in stepwise fashion is high when the actual signal combination deviates considerably from the preselected (fixed) combination of reference signals because the resistance of the photoresistor 38 is then low. The frequency decreases as the deviation of the monitored or actual signal combination from the selected combination of reference signals decreases.

It will be noted that the terminals A1-A12 of the comparator 26 receive (via 22) the signal combination which is furnished by the counter 13 during each revolution of the shutter 3, and such combination is compared with the preselected combination of reference signals furnished by the circuit 54 (or with a different variable combination which is furnished by the program circuit 47 when the switch 63 is closed). The circuitry which is shown in the drawing may constitute an integrated circuit (especially an MOS-circuit); this reduces the energy requirements of the motion picture camera.

The switch 63 is closed when the user of the camera desire to make exposures with fade-in, fade-out or fade-over (lap dissolve) effect. The input PE of the circuit 47 receives a positive signal which starts the binary counter 48. The input S of the counter 48 then receives one signal per film frame (in one position of the switch 65, 66) or a number of signals determined by the monostable multivibrator 70 and the frequency of the oscillator 71 (in the other position of the switch 65, 66). The aforementioned signal to the input S of the counter 48 is further transmitted to the counter 59 of FIG. 3 and the shift register 49 transports the signals by six bits. Such (transported) signals are applied to the terminals B1-B12 of the auxiliary comparator 56.

The counter 48 is switched by a step per film frame. Furthermore, the closing of the switch 63 results in transmission of a start signal to the frame counter 78 which operates in an up or forward mode, one step for each film frame. When the diaphragm 7 completes the fade-out operation by reducing the intensity of light which impinges upon motion picture film by six light levels, the signal combination at the terminals A1 to A12 of the auxiliary comparator 56 matches the shifted signal combination which is applied to the terminals B1-B12. The output Y of the auxiliary comparator 50 then transmits a signal which is applied to the input of the flip-flop 79 via Q of 47 and Q1. The output Q of 79 transmits a control signal which arrests the frame counter 78 and reverses the direction of counting. The signal from the output Q of 47 is further transmitted to the control unit 6 which reverses the direction of rotation of the motor 4 so that the film frames which were exposed with fade-out are transported backwards. The binary counter 48 is arrested, when the fade-out operation is completed, in response to a signal which is transmitted to its input CJ.

When the counter 78 reassumes its starting condition, its output Ü transmits a stop signal to the control unit 6 for the motor 4. Such signal is further transmitted to the contact Ü1 and input Ü of the circuit 47. The latter transmits the signal to the direction-reversing inputs U/D of its binary counter 48 via D-flip-flop 61 and inverter 62. This prepares the counter 48 for operation in an up mode. The same signal is also transmitted to and starts the counter 60. The latter then receives and stores signals which are transmitted by the generator of the voltage-frequency converter 12. This also applies for the counter 59.

The counter 60 transmits signal transporting impulses to the input SL of the shift register 49. Consequently, the original signal combination is applied again to the inputs A1-A12 of the shift register 49. When the operator thereupon completes the circuit of the motor 4 to start the next series of exposures, the diaphragm 7 is adjusted to produce a fade-in effect. When the signal combinations at A1-A12 match those at B1-B12, the exposures with fade-in are completed. The binary counter 48 is operated in reverse counting mode, one step per film frame, until the original signal combination is reached again. This completes the making of exposures with fade-in, i.e., the output Y of the circuit 26 transmits a stop signal to the circuit 30 for the stepping motor 31.

The reference characters 80 to 94 denote shunting resistors.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. In a motion picture camera, the combination of an adjustable diaphragm; motor means operative to adjust the effective size of the aperture which is defined by said diaphragm; a shutter mounted in front of said diaphragm for movement between light-transmitting and light-intercepting portions assumed during light-transmitting and light-intercepting phases of operation thereof, respectively; pulse generator means including frequency-determining photosensitive receiver means disposed behind said diaphragm so as to receive light which passes through said aperture during said light-transmitting phase, said pulse generator means being arranged to emit pulses whose duration is less than that of any of said phases and the number of which is proportionate to the amount of scene light which passes through the diaphragm during said light-transmitting phase; binary counter means connected with said pulse generator means and operative for counting the number of said pulses during each light-transmitting phase; means for activating said counter means in rhythm with movements of the shutter to said light-transmitting and light-intercepting positions; a shift register arranged to receive and advance the signal combination which is transmitted by said counter means at the completion of each activation of said counter means, said shift register having outputs for said signal combination; a first signal source operative to transmit a fixed reference signal combination; a digital comparator having first terminals connected with the outputs of said shift register and second terminals; a second signal source operative to transmit a variable second reference signal combination; and means for connecting said second terminals with one of said sources at a time, said comparator having output means operatively connected with said motor means.

2. The combination of claim 1, wherein said activating means comprises a signal generator including a photocell arranged to transmit signals as a function of the position assumed by said shutter.

3. The combination of claim 1, wherein said pulse generator means comprises a photosensitive receiver arranged to receive scene light via said aperture, an operational amplifier having input means connected with said receiver, and an output, and a voltage-frequency converter connecting said output of said amplifier with said counter.

4. The combination of claim 3, wherein said amplifier is an impedance converting amplifier.

5. The combination of claim 1, wherein said shift register is a digital shift register having a start input connected with said activating means, said counter means comprising a reset input and said activating means comprising time-delay means connected with said reset input.

6. The combination of claim 1, wherein said output means of said comparator includes first and second outputs respectively arranged to transmit first and second control signals which respectively cause said motor means to vary and interrupt the variation of the effective size of said aperture when the signal combination which is applied to said first terminals respectively deviates from and matches the signal combination which is applied to said second terminals.

7. In a motion picture camera having a rotary shutter, a diaphragm provided with a light-admitting aperture and signal-responsive means for adjusting said diaphragm so as to vary the effective size of said aperture, a fader comprising a digital comparator having first and second terminals and signal-transmitting output means operatively connected with said adjusting means; means for applying a first digital signal combination to said first terminals including means for generating pulses during a light-transmitting phase of rotation of the shutter the number of which is proportionate to the amount of scene light passing through said aperture during said light-transmitting phase, and means for counting the number of said pulses of the end of each light-transmitting phase and for issuing said first light signal combination in accordance therewith; a source of a digital variable reference signal combination; and means for selectively connecting said source with said second terminals for comparison with said first combination, said source comprising a bidirectional binary counter, means for advancing said counter by at least one step in response to each revolution of said shutter, and evaluating means connected with said counter and including shift register means controlled by said counter for shifting one of said digital signal combinations relative to the other; means for setting said counter in an up mode to thereby adjust said diaphragm for exposures with fade-out via said comparator and said adjusting means, means for terminating said mode upon completion of exposures with fade-out, means for effecting rearward transport of film frames exposed with fade-out in response to termination of said mode, and means for setting said counter in a reverse counting mode on completion of said rearward transport so as to adjust said diaphragm for exposures with fade-in via said comparator and said adjusting means.

8. The fader of claim 7, wherein said means for effecting rearward transport of film frames comprises reversible motor means and further comprising a bidirectional frame counter arranged to operate in an up mode in response to connection of said source to said second terminals, said evaluating means including means for reversing the direction of operation of said motor means and for setting said frame counter in a reverse counting mode when said counter completes the count of a predetermined number of film frames during exposure with fade-out, and means for arresting said motor means when said frame counter reassumes its original condition.

9. The fader of claim 8, wherein said frame counter constitutes said means for setting said binary counter in a reverse counting mode.

10. The fader of claim 9, wherein said counters have signal-receiving inputs and said advancing means comprises a pulse generator connected with said inputs of said counters and means for operating said pulse generator in synchronism with said shutter.

11. The fader of claim 7, wherein said binary counter comprises a preset-enable input arranged to receive a signal in response to connection of said source to said second terminals, and further comprising a second source arranged to apply a fixed reference signal combination to said second terminals via said binary counter in response to disconnection of said first mentioned source from said second terminals.

12. The fader of claim 7, wherein said shift register means has forward and reverse inputs; and wherein said evaluating means comprises an auxiliary digital comparator connected to said shift register means and said counter and impulse generator means, said shift register means having stages whose number exceeds the number of said second terminals by a number proportional to that of film frames exposed with fade-out, said impulse generator means comprising means for transmitting impulses to said forward input in response to starting of exposures with fade-out and to said reverse input in response to starting of exposures with fade-in.

13. The fader of claim 12, wherein the number of impulses which are transmitted to said forward and reverse inputs matches the difference between the number of stages of said shift register and the number of said second terminals.

14. The fader of claim 13, wherein said means for applying said first digital signal combination comprises at least one light-frequency signal generator and said impulse generator means has input means connected with said light-frequency signal generator.

* * * * *